May 3, 1966     C. E. PALMER     3,249,213
WINDOW CONTAINERS AND BLANKS AND METHOD FOR FORMING SAME
Filed Aug. 6, 1963     4 Sheets-Sheet 1

INVENTOR.
CHARLES E. PALMER

BY Peter L. Costas

ATTORNEY

May 3, 1966  C. E. PALMER  3,249,213
WINDOW CONTAINERS AND BLANKS AND METHOD FOR FORMING SAME
Filed Aug. 6, 1963  4 Sheets-Sheet 2
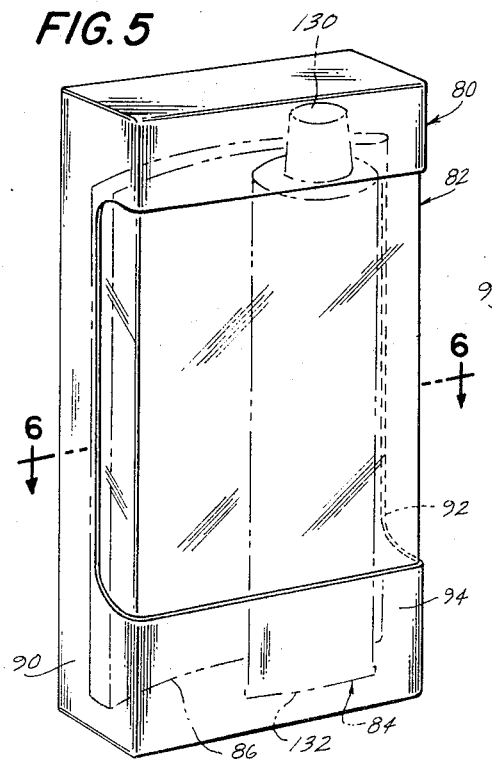
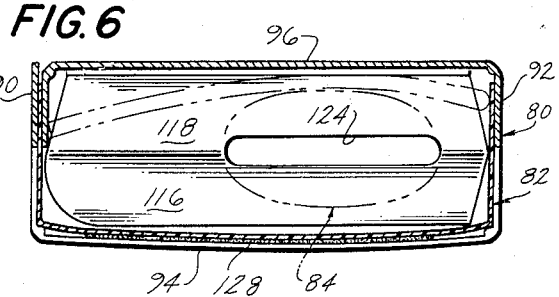
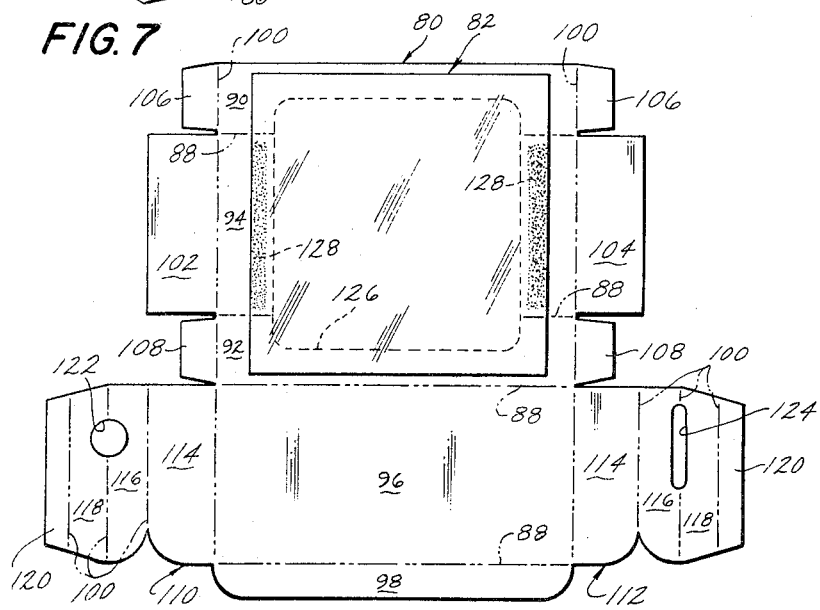
INVENTOR.
CHARLES E. PALMER
BY
*Peter L. Costas*
ATTORNEY

INVENTOR.
CHARLES E. PALMER

May 3, 1966  C. E. PALMER  3,249,213
WINDOW CONTAINERS AND BLANKS AND METHOD FOR FORMING SAME
Filed Aug. 6, 1963  4 Sheets-Sheet 4

INVENTOR.
CHARLES E. PALMER
BY
Peter L. Costas
ATTORNEY

United States Patent Office 3,249,213
Patented May 3, 1966

3,249,213
WINDOW CONTAINERS AND BLANKS AND
METHOD FOR FORMING SAME
Charles E. Palmer, Somers, Conn., assignor to Monsanto
Company, St. Louis, Mo., a corporation of Delaware
Filed Aug. 6, 1963, Ser. No. 300,330
12 Claims. (Cl. 206—45.31)

The present invention relates to containers, and, more particularly, to containers having a novel window construction and to blanks and the method for forming the same.

Paperboard containers having windows of transparent synthetic plastic sheet material are employed widely for displaying the contents to the prospective purchaser and for achieving attractive package styling. Most window containers presently in the marketplace employ thin, highly flexible film as a cover for the window sheet material and, accordingly, the window apertures in the paperboard sheet material have generally been small when it was desired to obtain a relatively high-strength and durable container.

In copending United States application Serial Number 191,018, filed April 30, 1962, now Patent No. 3,199,670, granted December 23, 1964 and entitled Container and Method of Making Same, there is disclosed an improved window container of relatively high strength having a window of semi-rigid synthetic plastic sheet material with at least one fold therein. To accommodate the displacement of the plastic material at the fold line of the paperboard and window, means are provided for relative slippage and displacement of the plastic material which is secured to the paperboard on both sides of the fold line.

It is an object of the present invention to provide a novel window container having a folded window of semi-rigid synthetic plastic sheet material extending about a corner thereof and of sufficient strength to resist impacts occurring during normal usage and contributing to the overall strength of the assembly.

Another object is to provide a blank of relatively rigid paperboard and semi-rigid synthetic plastic sheet material which may be readily cold-folded at high speeds to provide a relatively high-strength container having a folded window extending about an edge thereof.

It is also an object to provide a simple and rapid method for cold-folding a blank of paperboard and semi-rigid synthetic plastic sheet material into an attractive window container wherein the window of plastic sheet material extends about an edge of the container and cooperates with the paperboard to provide relatively high strength and durability.

Other objects and advantages will be readily apparent from the following detailed description and claims and the attached drawings wherein:

FIGURE 5 is a perspective view of another container embodiment of the present invention with a collapsible tube and booklet received therein shown in phantom line;

FIGURE 6 is a sectional view to an enlarged scale along the line 6—6 of FIGURE 5;

FIGURE 7 is a plan view to a reduced scale of the blank for the container of FIGURES 5 and 6;

Figure 1:
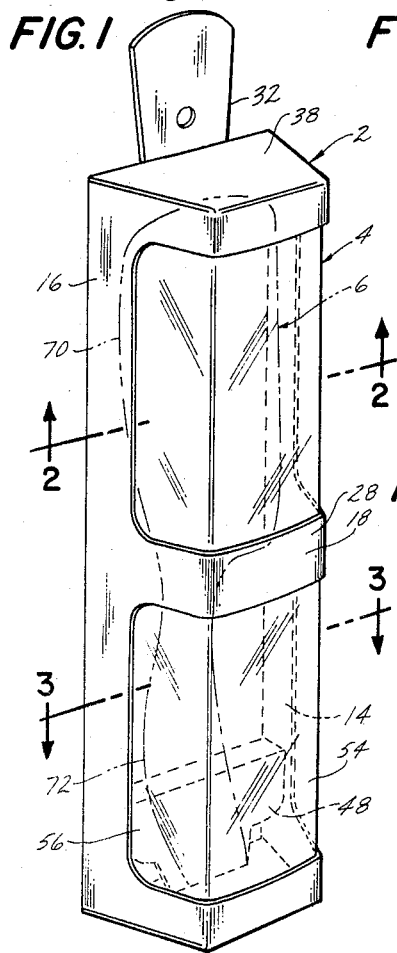
FIGURE 1 is a perspective view of a container embodying the present invention with a hairbrush received therein shown in phantom line.

It has now been found that the foregoing and related objects can be readily attained in a container formed of a frame of relatively rigid and opaque sheet material and a window of semi-rigid, synthetic plastic sheet material with a substantially linear fold therein and having the frame overlapping opposed side margins of the window substantially normal to the direction of the fold therein. The window is secured or bonded to the frame upon one side only of the fold therein, and the window on the unsecured side is free to move relative to and along the side surface of the adjacent panel of the paperboard frame so as to accommodate the thickness of the window material and the depth of the scoring of the paperboard frame. In the erected container, the fold line in the plastic window is displaced slightly from the fold line in the paperboard frame. Thus, relatively thick plastic sheeting may be folded within the paperboard frame without excessive stress upon the paperboard frame at the weakened line of fold therein such as would be produced by buckling of the plastic window or uneven separation of the window from the frame if they were to be secured together on both sides of the fold line without providing means for accommodating the window fold. Thus, there is provided a simple, attractive and relatively high strength display package.

In folding the container of the present invention, a blank having a window which has an unbroken and smooth surface is preferably employed for greatest strength, although a window having score or weakening lines may also be employed. The cold-folding method described and claimed in United States Patent Number 2,954,725, granted October 4, 1960, and entitled Method and Apparatus for Folding Plastic Sheet Stock, is most desirably utilized to provide a sharp, relatively craze-free fold at high speeds and low cost, although heat-forming of the folds is possible albeit at lesser speeds and at higher cost.

In the preferred method, the blank is supported between die pads of resiliently deformable material and a rigid folding blade member at the lines of fold within the frame-free portions of the blank or apertured portions of the frame. The window material and blade member then are depressed into the resiliently deformable material of the die pads sufficiently to cause the deformable material to flow and fold the window about the edge of the folding blade member and against the surface thereof to establish a permanent fold therein, but little or no compressive pressure is placed upon the paperboard frame to avoid injuring the outer surface thereof. Upon relaxation of the folding pressure, the window assumes the desired angle of fold and the unbonded portion displaces itself along the adjacent surface of the frame sufficiently to accommodate the excess dimensions of the window material and score line in the frame.

The window may have two spaced linear folds therein and, in this instance, is bonded to the frame along the overlapping portions between the spaced folds. In this manner, each of the outer portions is unbonded and free to move relative to the adjacent panel of the frame.

Referring now in detail to the attached drawings, FIGURES 1–4 illustrate a six-sided display window container having a frame of paperboard sheet material generally designated by the numeral 2 and a folded window of transparent, semi-rigid synthetic plastic sheet material generally designated by the numeral 4. Received within the container is a brush illustrated in phantom line and generally designated by the numeral 6.

Figure 2:
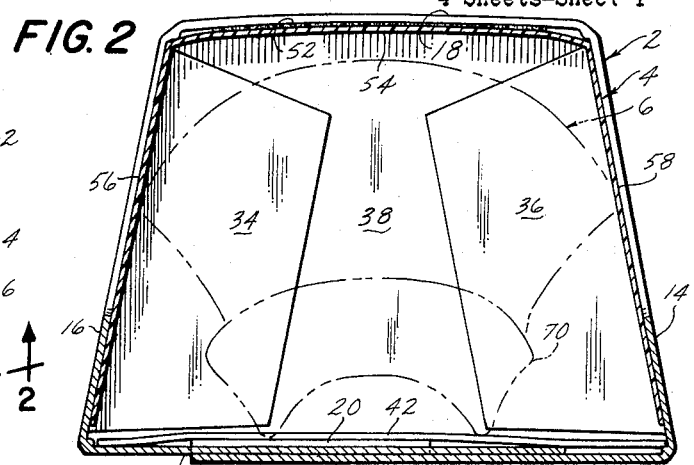
FIGURE 2 is a sectional view to an enlarged scale along the line 2—2 of FIGURE 1.
Figure 3:
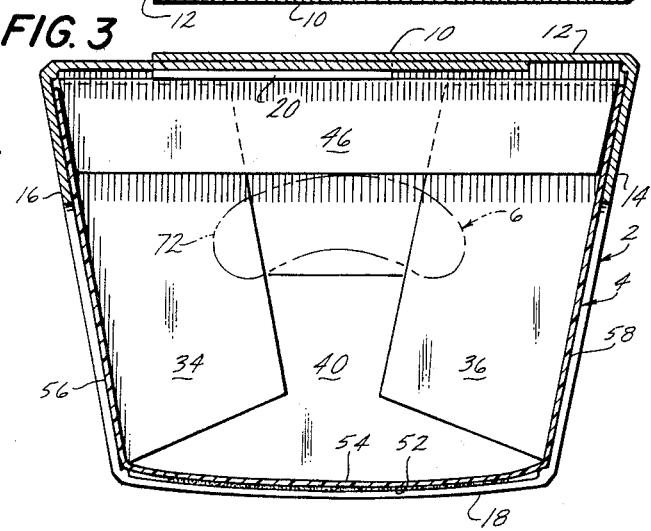
FIGURE 3 is a similar sectional view along the line 3—3 of FIGURE 1.
Figure 4:
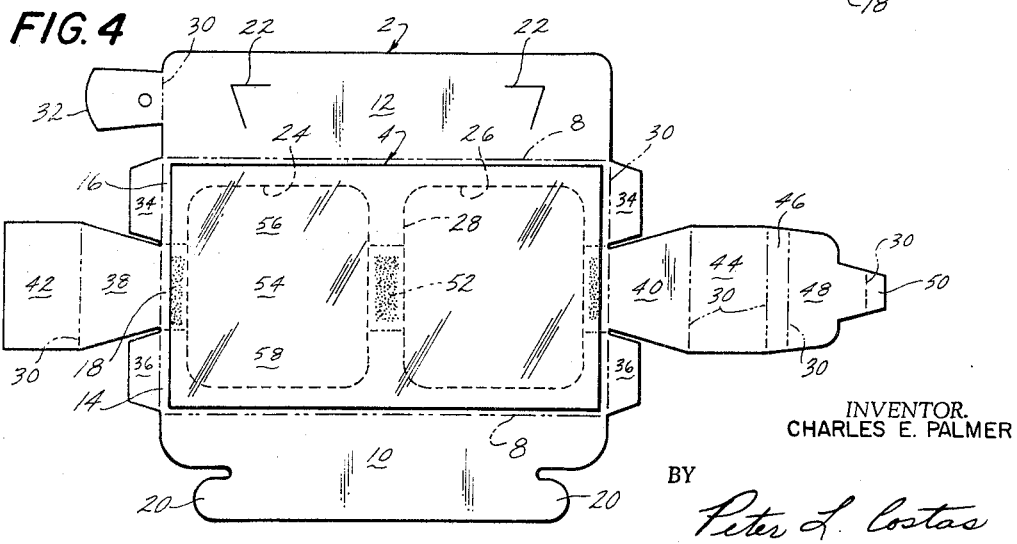
FIGURE 4 is a plan view to a reduced scale of the blank for the container of FIGURES 1-3.

As best seen in the illustration of the blank in FIGURE 4, the paperboard frame 2 is integrally formed and is cut and provided with longitudinal score or weakening lines 8 so as to provide a body portion of trapezoidal cross section which is best seen in FIGURES 2 and 3. More particularly, the score lines 8 define a pair of overlapping and interlocking rear wall panels 10, 12 at the sides of the blank, side wall panels 14, 16 adjacent thereto and the front wall panel 18 in the center thereof. When folded into erected position, the locking tabs 20 on the overlying rear wall panel 10 engage in the cooperating locking slits 22 of the rear wall panel 12. A pair of spaced, generally rectangular window apertures 24, 26 center upon the front wall panel 18 and extend into the side wall panels 14, 16 with the spacing therebetween defining a strap portion 28.

The blank is also cut and provided with transverse score or weakening lines 30 which define the end closures of the container and an apertured tab 32 on the rear wall panel 12 by which the container may be hung for display purposes. More particularly, the cuts and score lines 30 define dust flaps 34, 36 on the side wall panels 14, 16 and closure panels 38, 40 having tuck flaps 42, 44. The portion of the blank providing the bottom end closure panel 40 is cut and scored to provide a spacing panel 46, a platform panel 48 and a glue flap 50.

The window 4 is of generally rectangular configuration and is of larger dimension than the outside margins of the apertures 24, 26 so that the marginal portions of the frame about the outside margins of the apertures 24, 26 overlap the outside margins of the window and the strap portion 28 extends across the center thereof. The window 4 is bonded to the front wall panel portion 18 of the frame 2 by interposed adhesive layer 52 at the outer overlapping margins thereof and at the strap portion 28 but is free from bonding to the side wall panel portions 14, 16 so that relative movement is permitted between the opposed surfaces thereof.

When the blank is erected into the container, the dust flaps 34, 36 are secured to the end closure panels 38, 40 by adhesive (not shown) and the glue flap 50 is secured to the end closure panel 40 by adhesive (not shown). Although the window 4 may be scored along the intended fold lines corresponding to the fold lines between the front wall panel 18 and the side wall panels 14, 16 to provide the front wall portion 54 and side wall portions 56, 58, the unscored and unweakened plastic material is preferably cold-folded in accordance with the aforementioned United States Patent Number 2,954,725.

Figure 11:
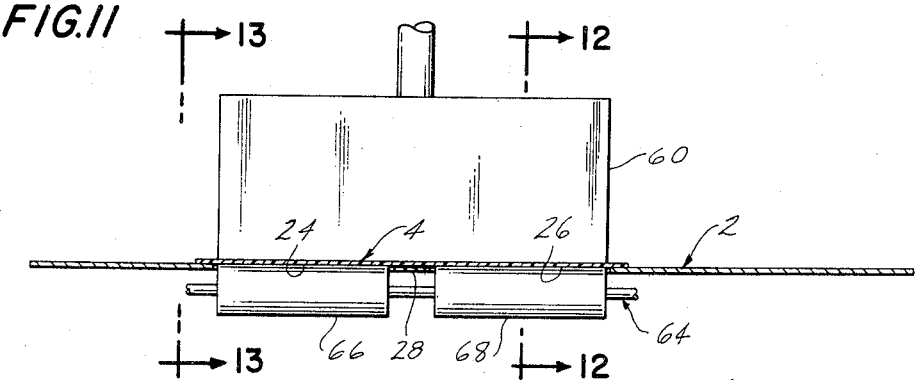
FIGURE 11 is a perspective view of a folding mandrel and blank during the folding operation in accordance with one aspect of the method of the present invention.
Figure 12:
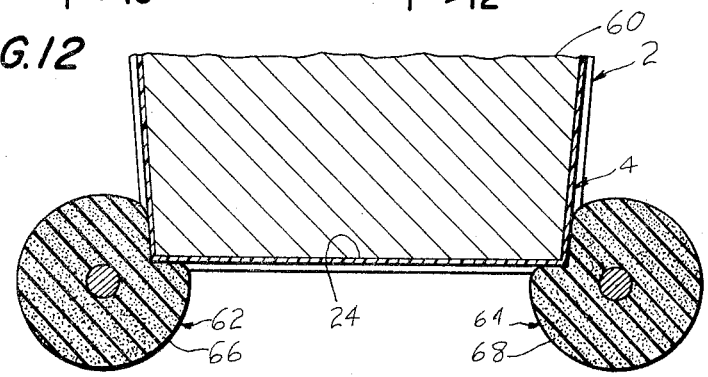
FIGURE 12 is an enlarged fragmentary sectional view normal to the line of fold and through the plastic window during the folding operation of FIGURE 11.
Figure 13:
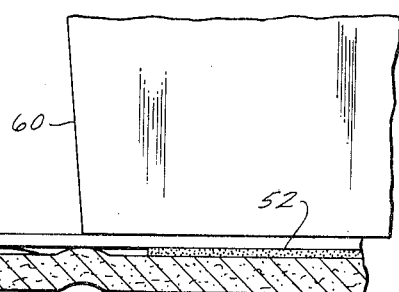
FIGURE 13 is an enlarged fragmentary sectional view normal to the line of fold and through the paperboard material during the folding operation.

As best seen in FIGURES 11–13, a folding mandrel 60 of generally trapezoidal cross section is mounted for movement normal to the blank. A pair of rotatably supported die pad assemblies generally designated by the numerals 62, 64 having die pads 66, 68 of resiliently deformable material such as rubber are located under the lines of intended fold. The mandrel assembly 60 presses the plastic material of the window into the die pads 66, 68, and the deformable material flows to fold the plastic window about the blade edges of the mandrel 60 and against the side surfaces thereof as seen in FIGUDE 12, thus effecting a permanent fold without crazing. As pointed out in the aforementioned patent, the angle of fold upon removal of the mandrel 60 is determined by the angle to which the plastic is folded about the blade edge, overfolding of about 10 to 20 degrees beyond the desired angle being necessary for most plastic materials. The resilient die pads 66, 68 extend only within the window apertures 24, 26 so that no confinement or pressure is placed upon the paperboard frame such as would injure the material thereof, but the folds in the window 4 formed within the apertures 24, 26 will extend into the overlapped portions of the window.

Figure 14:
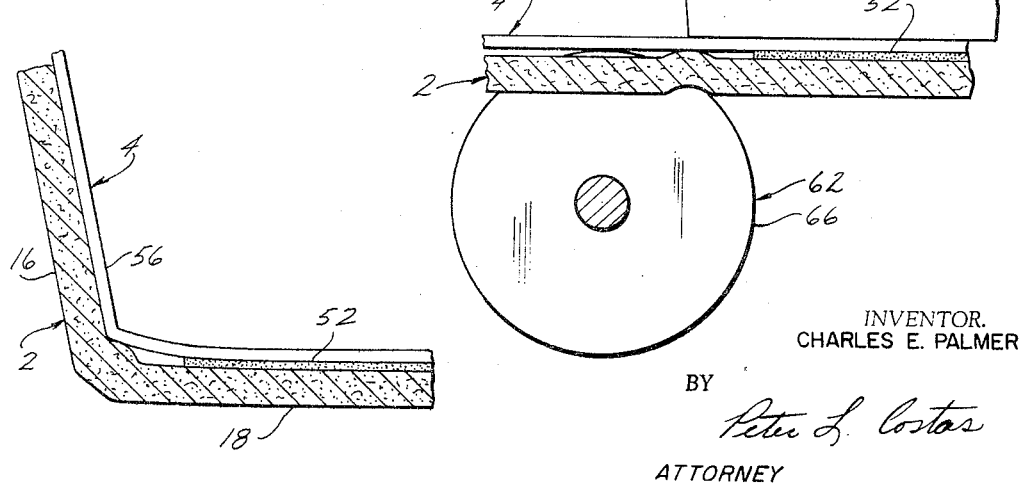
FIGURE 14 is a fragmentary sectional view of a folded container.

As can best be seen in FIGURES 13 and 14, the problem with which the present invention is concerned will occur if the window 4, which has a substantial thickness of its own, is to be folded along a line generally coinciding with the fold line in the paperboard frame 2 which has a projecting portion on the inner surface produced by the scoring upon the opposite surface to aggravate the inward displacement of the fold line in the window. To compensate for substantial depth of the scoring projection and the thickness of the plastic window inwardly of the fold in the frame, the fold in the window 4 must be displaced somewhat from full alignment and contact with the fold in the frame. As seen in FIGURE 14, the unbonded side wall portion 56 of the window moves relative to the surface of the side wall panel 16, so that the fold therein is displaced along the side surface of the frame away from the front wall panel 18, thus accommodating the deviation in distance from the actual fold line in the paperboard frame 2.

After the blank has been folded, the brush 6 is inserted through the opened rear wall panels 10, 12 with the bristles of the head portion 70 resting upon the window 4 adjacent the end closure panel 38 and the end of the handle portion 72 resting upo nthe platform panel 48 to maintain the desired orientation of the brush within the container. Inward displacement of unsecured side wall portions 56, 58 of the window 4 is limited by the bristles of the head portion 70 of the brush 6 adjacent the end closure panel 38 and by the platform panel 48 and spacing panel 46 which extend therebetween adjacent the end closure panel 40. Access to the interior of the container for removal of the contents is readily provided by the releasably interlocked rear wall panels 10, 12.

Referring now to FIGURES 5–7 of the drawings, the embodiment therein similarly has a frame of relatively rigid paperboard sheet material designated by the numeral 80 and a window of semi-rigid synthetic plastic sheet material generally designated by the numeral 82. Received within the container are a collapsible tube generally designated by the numeral 84 and an instruction booklet for use of the contents of the tube 84 designated by the numeral 86.

As best seen in the illustration of the blank in FIGURE 7, the paperboard frame is cut and provided with longitudinal score or weakening lines 88 which define side wall panels 90, 92, front wall panel 94, rear wall panel 96 and tuck flap 98 to provide a generally rectangular body portions. Cuts and transverse score lines 100 define end closure panels 102, 104 hingedly connected to the front wall panel 94, dust flaps 106, 108 connected to the side wall panels 90, 92 and the support elements generally designated by the numerals 110, 112 and hingedly connected to the rear wall panel 96. More particularly, the support elements 110, 112 have a plurality of transverse fold lines 100 providing spacing panels 114 extending along the surface of the end closure panels 102, 104, a pair of arch panels 116, 118 which are dimensioned to converge at a point spaced inwardly from the spacing panels 114 and glue flaps 120. At the fold line or interconnection of the arch panels 116, 118, the support element 110 has a circular aperture 122 therein and the support element 112 has an elongated slot 124 therein. The frame has a large generally rectangular window aperture 126 which is centered in the front wall panel 94 and extends into the side wall panels 90, 92.

The window 82 is of generally rectangular configuration and is of larger dimension than the window aperture 126 so that the marginal portions of the frame about the aperture 126 overlap the edges thereof. The window 82 is bonded only to the front wall panel portion 94 of the frame by an interposed layer of adhesive 128 and is free from bonding to the side wall portions 90, 92.

When the blank is erected into the container, the dust flaps 106, 108 are secured to the end closure panels 102, 104 by adhesive (not shown) and the arch panels 116, 118 are folded to form the desired configuration for the support elements 110, 112 after which the glue flaps 120 are secured to the spacing panels 114 (not shown).

When the tube 84 is inserted, the cap portion 130 thereof is inserted intot the aperture 122 and the base portion 132 thereof is inserted into the slot 124. The booklet 86 is placed thereon and the rear wall panel 96 is closed by inserting the tuck flap 98. Inward displacement of the unbonded side portions of the window from the side wall panels 90, 92 in the assembled package is limited by the booklet 86 which bears thereagainst and the tuck flap 98.

Figure 8:
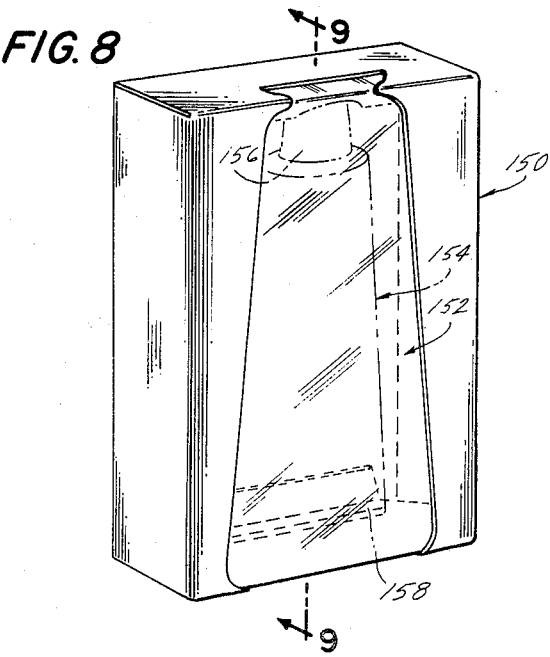
FIGURE 8 is a perspective view of still another container embodiment of the present invention with a tube received therein shown in phantom line.
Figure 9:
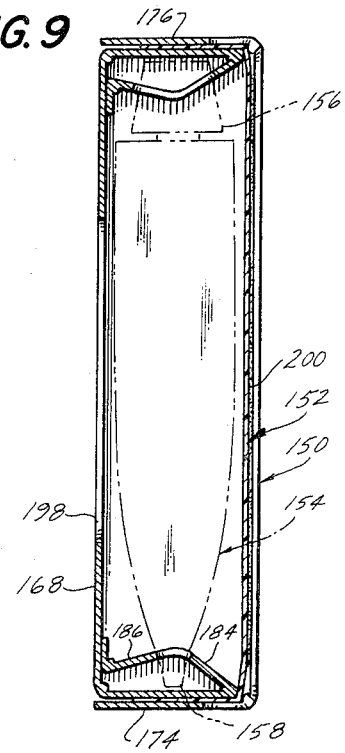
FIGURE 9 is a sectional view to an enlarged scale along the line 9—9 of FIGURE 8.
Figure 10:
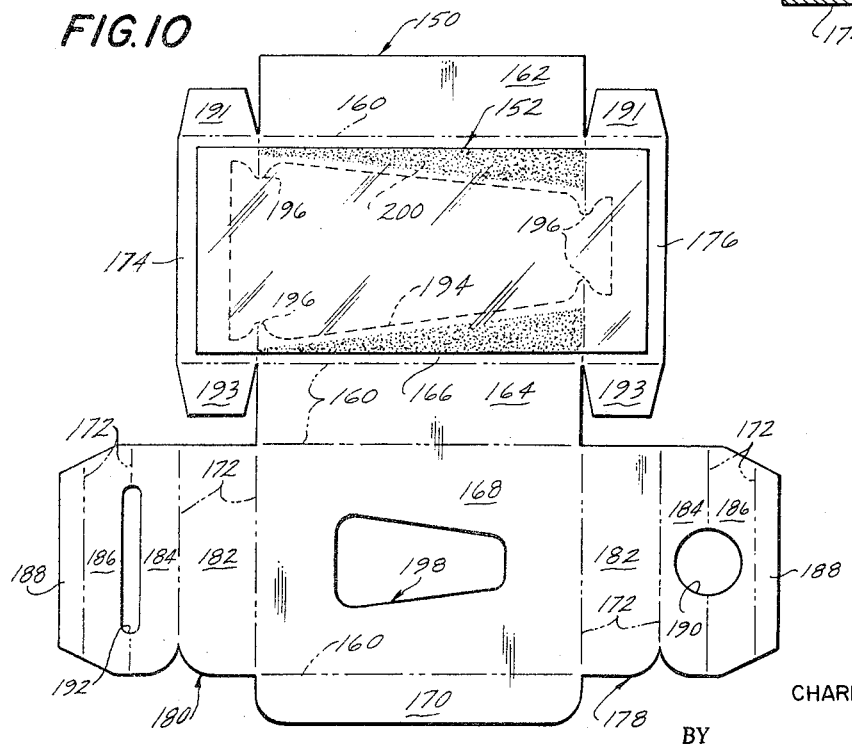
FIGURE 10 is a plan view to a reduced scale of the blank for the container of FIGURES 8 and 9.

Referring now to FIGURES 8–10, the container embodiment illustrated therein has a frame of paperboard sheet material generally designated by the numeral 150 and a window of semi-rigid synthetic plastic sheet material generally designated by the numeral 152. Received within the container is a collapsible tube of translucent material generally designated by the numeral 154 and having a cap portion 156 and a base portion 158.

As best seen in the illustration of the blank in FIGURE 10, the paperboard frame 150 is cut and provided with longitudinal score or weakening lines 160 which define side wall panels 162, 164, front wall panel 166 therebetween, rear wall panel 168 and tuck flap 170, thus providing a generally rectangular body portion. Cuts and transverse score lines 172 define end closure panels 174, 176 hingedly connected to the front wall panel 166, and the support elements hingedly connected to the rear wall panel 168 and generally designated by the numerals 178, 180. More particularly, each of the support elements 178, 180 has a plurality of transverse score lines 172 providing a spacing panel 182, a pair of arch panels 184, 186 which are dimensioned to converge at a point spaced inwardly from the spacing panels 182 and a glue flap 188. At the interconnection of the arch panels 184, 186, the support element 178 has a circular aperture 190 therein and the support element 180 has an elongated slot 192 therein. The longitudinal score lines 160 also define dust flaps 191, 193 hingedly connected to the end closure panels 174, 176.

The frame 150 has a generally trapezoidal window aperture 194 therein which has its base in the end closure panel 174 and extends through the front wall panel 166 into the end closure panel 176. To provide a pleasing outline complementing that of the collapsible tube 154, the frame 150 has opposed curvilinear fingers 196 extending inwardly of the general outline of the window aperture 194 at the fold lines 172 interconnecting the end closure panels 174, 176 and the front wall panel 166. To illuminate the translucent tube 154, the frame 150 has a generally trapezoidal illuminating aperture 198 in the rear wall panel 168 which registers with the tube 158 and admits light therethrough to display effectively the color thereof.

The window 152 is of generally rectangular configuration and is dimensioned larger than the window aperture 194 so that the edges thereof are overlapped by the marginal portions of the frame 150 about the window aperture 194. A layer of interposed adhesive 200 bonds the window 152 to only the front wall panel portion 166 of the frame 150 and the frame and window are free from bonding along the side wall panel portions 162, 164.

When the blank is erected, the dust flaps 191, 193 are secured to the side wall panels 162, 164 by adhesive (not shown) and the arch panels 184, 186 are folded to form the desired configuration for the support elements 178, 180 after which the glue flaps 188 are secured to the rear wall panels 168 by adhesive (not shown).

When the tube 154 is inserted, the cap portion 156 seats in the aperture 190 and the base portion 158 seats in the slot 192. In this embodiment, inward displacement of the unbonded end portions of the window 152 from the end closure panels 174, 176 is limited by the spacing panels 182 of the support elements 178, 180. Light entering the interior of the container through the illuminating aperture passes through the translucent tube 154 and displays the color of the contents thereof.

In each of the illustrated embodiments, it can be seen that the window is free to move relative to and along the surface of the frame on one side of the fold formed therein, thus accommodating the displacement of the fold line caused by the score embossment and the thickness of the window material. In each of the embodiments, undesirable movement of the unbonded portion of the window inwardly of the adjacent panel of the frame is limited by means holding the window adjacent the frame. The limiting means may be elements of the paperboard frame alone as in the embodiment of FIGURES 8–10, the combination of elements of the frame and the goods received within the container as in the embodiments of FIGURES 1–4 and 5–7, or it may be the goods alone.

As previously stated, the preferred container blanks and method employ an unscored plastic window which is cold-folded in accordance with the aforementioned United States Patent Number 2,954,725 although scoring along the intended fold line may be employed with some loss in strength. Thermoforming of the unscored window may also be employed with lesser speed and higher cost.

Although some plastic materials may be bonded to the frame by their own substance through the application of solvent and/or heat, a separate adhesive coating interposed therebetween is most desirably employed. Generally, the adhesive or bonding should terminate at a point spaced from the fold line to minimize stress upon the bonded portion by permitting a greater radius of displacement, as shown in the illustrated embodiments.

The frame may be readily fabricated from paperboard sheet material of 12 to 50 mils in thickness, which provide ample rigidity for this purpose. Since the paperboard may be dyed or printed readily, wide variations in appearance of the container are possible.

The synthetic plastic sheet material employed for the window should be semi-rigid with sufficient flexibility to accommodate stresses and impacts occurring during normal usage. The material preferably should have the characteristics of being foldable in accordance with the method of the aforementioned United States Patent Number 2,954,725 and of substantially retaining a fold made therein to permit cold-folding in accordance therewith for rapid operation with unscored blanks to provide high-strength folds.

Exemplary of the various synthetic plastic sheetings which may be employed are biaxially oriented polystyrene, cellulose acetate, cellulose acetate butyrate, polyvinyl chloride-acetate copolymer, polyethylene and polypropylene. As a specific example of a highly advantageous material, biaxially oriented polystyrene of about 5 to 15 mils has been particularly effective because of its clarity, high strength and semi-rigidity coupled with sufficient resiliency and flexibility to provide durable folds and resistance to normal impacts.

Thus, it can be seen that the present invention provides a novel window container having a folded window of semi-rigid synthetic plastic sheet material extending about a corner thereof. The window is of sufficient strength to resist impacts occurring during normal usage and contributes to the overall strength of the container by reason of its reinforcement of the apertured frame. The invention also provides a relatively economical blank and method for speedily and easily forming a desirable and attractive container of relatively high strength with a folded window therein.

Having thus described the invention, I claim:

1. A display container having a frame of opaque, relatively rigid sheet material; a window of semi-rigid synthetic plastic sheet material having a linear fold therein, said frame overlapping opposed side margins of said window generally normal to the direction of fold in said window; and means securing said window to said frame along said overlapping side margins on only one side of said linear fold, said window being free from bonding to said frame on the other side of said fold to permit relative movement thereof along the surface of said frame.

2. The container of claim 1 wherein said window has two spaced folds therein and is secured to said frame along the overlapping side margins between said folds.

3. The container of claim 1 wherein said frame has means thereon holding said window on said other side of said fold adjacent the inside surface of said frame.

4. A six-sided display container having a frame of relatively rigid paperboard material with a plurality of hingedly connected panels providing the six-sides of the container, said frame having a window aperture therein extending across the hinged interconnection between two of said panels; a window of semi-rigid synthetic plastic sheet material of larger dimension than said window aperture and having a linear fold therein generally in alignment with the interconnection between said two panels, said frame having marginal portions about said aperture overlapping the margins of said window; and means bonding said window to only one of said two panels of said frame along said overlapping margins, said window being free from bonding to the other of said two panels to permit relative movement thereof along the inner surface of said other panel.

5. The display container of claim 4 wherein said frame has means thereon for holding said window adjacent the inner surface of said other panel.

6. The display container of claim 5 wherein said means is a panel hingedly connected to one of the panels defining the sides of the container and disposed inwardly thereof.

7. A six-sided display container having a frame of relatively rigid paperboard sheet material with a plurality of panels providing the front, rear, side and end walls of said container, said frame having a window aperture in the front wall panel thereof and extending into opposed wall panels selected from the group consisting of end wall panels and side wall panels; a window of semi-rigid synthetic plastic sheet material of larger dimension than said window aperture and extending under said front and opposed wall panels, said window having a pair of spaced linear folds therein generally in alignment with the interconnection between said front and opposed wall panels, said frame having marginal portions about said aperture overlapping the margins of said window; and means bonding said window only to said front wall panel of said frame along said overlapping margins, said window being free from bonding to said opposed panels to permit relative movement thereof along the inner surface of said opposed panels.

8. A blank for a display container comprising a window of semi-rigid synthetic plastic sheet material; a frame of relatively rigid, opaque sheet material overlapping opposed side margins of said window and having weaking lines therein defining folds to be made in forming the sides of the container, one of said weakening lines intersecting the margins of said window; and means securing said window to said frame along said overlapping side margins on only one side of said intersecting weakening line, said window being free from engagement to said frame on the other side of said intersecting weakening line.

9. The blank of claim 8 wherein two spaced weakening lines intersect the margins of said window and said means secures said window to said frame only between the intersecting weakening lines.

10. A blank for a six-sided display container comprising a window of synthetic plastic sheet material; an integrally formed paperboard frame having a window aperture therein of lesser dimension than said window with marginal portions thereabout overlapping the margins of said window, said frame having weakening lines therein defining folds to be made in forming the six sides of the container with two spaced weakening lines intersecting the margins of said window within said window aperture; and means bonding said window to said frame along the overlapping marginal portions only between said intersecting weakening lines, said window being free from bonding to said frame on the outer sides of said intersecting weakening lines to permit relative slippage therebetween.

11. The blank in accordance with claim 10 wherein said frame has weakening lines extending generally normal to said intersecting weakening lines and defining panels to extend within said container between said weakening lines and the unbonded portions of said window to hold said unbonded portions adjacent the inner surface of said frame.

12. In the method of fabricating a display container, the steps comprising forming weakening lines in a frame of paperboard sheet material defining folds to be made in the container formed therefrom with one of said fold lines intersecting the margins of an aperture in said frame for receiving a window; securing a window of semi-rigid synthetic plastic sheet material to said frame in overlapping relationship of said frame aperture and along side margins on only one side of said intersecting weakening lines, said window being free from engagement to said frame on the other side of said intersecting weakening line; supporting said assembly between a die pad of resiliently deformable material and a rigid folding blade, said die pad underlying said window along a line registering with said intersecting weakening line but terminating prior to the margins of the frame; and pressing said plastic window and mandrel into said die pad sufficiently to cause the deformable material to flow and fold the plastic window about the folding blade to establish a permanent fold in said window with said frame being substantially free from compressive pressures and said unengaged portion of said window displacing along the surface of said frame during said pressing and formation of the fold.

References Cited by the Examiner

UNITED STATES PATENTS

| 2,113,288 | 4/1938 | Berger | 206—45.31 |
| 2,115,309 | 4/1938 | Koch | 206—45.34 |
| 2,170,906 | 8/1939 | Mertz | 206—45.31 X |
| 2,289,236 | 7/1942 | Broderick | 206—45.31 X |
| 2,521,184 | 9/1950 | Paige | 206—45.19 |
| 2,637,482 | 5/1953 | Broderick | 206—45.31 X |
| 2,663,489 | 12/1953 | Paige | 206—45.34 X |
| 2,714,446 | 8/1955 | Gillam | 206—45.31 |
| 2,948,390 | 8/1960 | Wagaman | 206—45.31 |
| 3,089,590 | 5/1963 | Mell | 229—8 |

FOREIGN PATENTS 448,812  6/1948  Canada.

LOUIS G. MANCENE, *Primary Examiner.*

THERON E. CONDON, *Examiner.*